United States Patent [19]

Forbes

[11] 3,739,351

[45] June 12, 1973

[54] PHASE CONTROL CIRCUITS

[75] Inventor: Donald F. Forbes, Oakton, Va.

[73] Assignee: The United States of America as represented by the Secretary of the Navy, Washington, D.C.

[22] Filed: Feb. 22, 1972

[21] Appl. No.: 228,186

[52] U.S. Cl. ............................ 340/172.5, 178/69.5
[51] Int. Cl. ............................ H04n 1/36, H041 7/00
[58] Field of Search .................. 178/69.5; 340/172.5

[56] References Cited

UNITED STATES PATENTS

| | | | |
|---|---|---|---|
| 3,546,703 | 12/1970 | Kurth | 178/69.5 |
| 3,544,717 | 12/1970 | Smith | 178/69.5 |
| 3,654,492 | 4/1972 | Clark | 178/69.5 |
| 3,668,315 | 6/1972 | Heitzman | 178/69.5 |
| 3,678,200 | 7/1972 | Clark | 178/69.5 |

*Primary Examiner*—Raulfe B. Zache
*Assistant Examiner*—Mark Edward Nusbaum
*Attorney*—R. S. Sciascia, Arthur L. Branning and Philip Schneider

[57] ABSTRACT

The invention relates to digital circuitry for synchronizing the system clock with the received data when a calibrate circuit indicates that the proper clear data has been received. The clock control operates in two modes. In the first mode the clock is allowed to run at a predetermined frequency at the end of a data frame (reset pulse). The clock is allowed to run at the predetermined frequency until the calibrate signal has been received as clear data and an indication to track is given by the calibrate clock on circuit. Upon receipt of the track indication the clock frequency is shifted from the predetermined frequency by an amount determined by the delay clocking between the clock pulses and the indication of all zero's indication calibrate pulse by the calibrate lock on circuit. The same shift in duty cycle is maintained through out each frame. Thus, the synchronizing circuit causes the clock to hunt about while locked on the received data. Thereby tracking the received data.

1 Claim, 7 Drawing Figures

PHASE CONTROL CIRCUITS

This application is related to application Ser. No. 288,186 filed by the same inventor for CALIBRATE LOCK ON CIRCUIT AND DECOMMUTATOR.

BACKGROUND OF THE INVENTION

With the development of satellites and other unattended systems which may periodically transmit data in bunches or frames followed by spaces, wherein each segment of the frame represents some analog value, a system as needed which could receive the signal and remove the data therefrom. Such a system had to be automatic in nature responding only to the received signal. Unattended systems often use less than precision clocks in favor of reliability, therefore, the receiving system must be able to synchronize with data which may not be sent at the same rate as the receiving master clock. Such a system is shown in FIG. 1.

SUMMARY OF THE INVENTION

The invention is used in synchronizing the system clock with the received data by determining the amount of delay between the clocking pulse and the receipt of a clear calibrate pulse. This delay is then used to drive the clock so as to increase the frequency or decrease the frequency as necessary to achieve proper phase.

STATEMENT OF OBJECTS

It is therefore an object of the invention to provide an improved clock synchronizing circuit.

Yet another object of the present invention is to provide an improved circuit for control of a system clock in response to changes in the received data.

BRIEF DESCRIPTION OF THE DRAWINGS

Figures 1, 2:
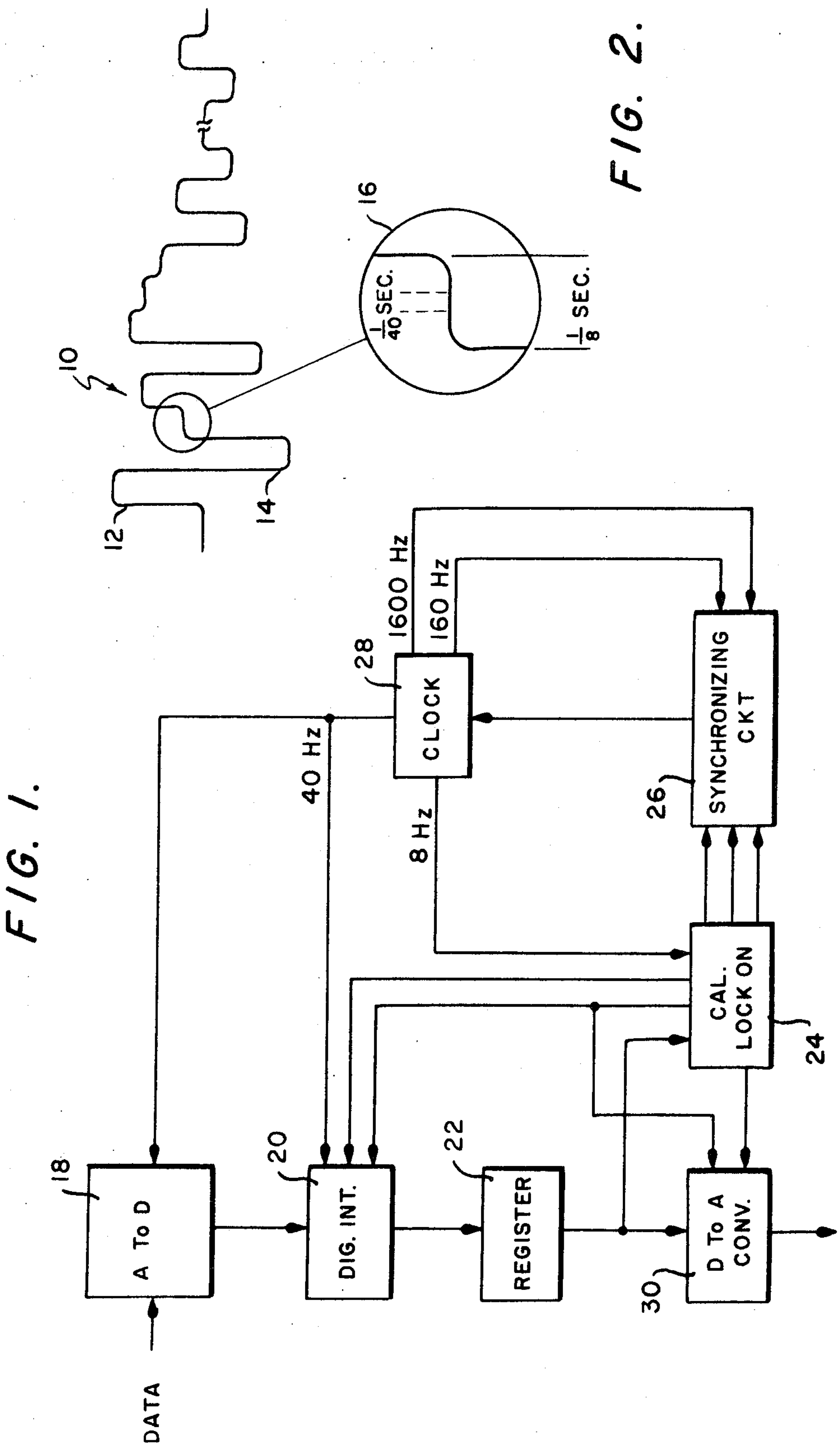
FIG. 1, shows the overall system for receiving data.
FIG. 2, shows the analog data.

Referring to FIG. 2, the data waveform 10 comprises a calibrate signal followed by analog data of varying amplitudes which form a frame. The calibrate pulse is in essence an analog indication of a full scale reading in one direction followed by an analog full scale reading in the other direction. That is pulse 12 is a reading of analog zero while 14, is, a reading of analog full scale. These pulses 12 and 14 are used to trigger the calibrate and lock on circuitry. The waveform 10 comprises calibrate pulses 12, 14, and 30 other segments of data each segment giving a reading of some function of satellite operation, say battery voltage while another segment might be giving current draw from the battery. Thus, each segment must be addressed as to its position in the data waveform or frame so that it can be correlated by further processing equipment with the data. The frame is there for 32 segments numbered 0 — 31. The data waveform 20 is ideally sampled at some point near the center of each segment as the waveform is slightly integrated at the beginning and end of each segment, note exploded segment. Each segment has a width of approximately ⅛ sec and is sampled over 1/40 sec. Now referring to FIG. 1, the data waveform 10 is fed into a A to D converter 18 where the data segments are converted from analog to digital words of say 10 bits at the rate of forty thousand samples per second. These samples are fed to a digital integrator 20 which integrates 1,000 samples each approximately 1/40 sec at the end of each sampling period the output, an average of these 1000 samples is dumped into register 22. The digital integrator 20 continues to sample starting again at the end of each sampling period until the calibrate lock on circuit 24 receives an indication of all zeros. (i.e. the 10 bit digital word reads all zeros) Thereafter the digital integrator 20 is triggered an ⅛ sec later in the next segment, and again in the next segment until the end of the frame where the digital integrator 20 is again allowed to free run, continue to sample, by the calibrate lock on circuit 24 until the beginning of the next frame and proper calibrate of all zeros in that next frame. The calibrate lock on circuit 24 receives the output of register 22 as digital words of 10 bits in length. During the search mode the calibrate lock on circuit is looking for all zeros followed by all ones. Upon receipt of all zeros a pulse is generated indicating the receipt of all zeros. The all zeros pulse is fed to the synchronizing circuit 26 and is compared in phase with an 160 Hz clock pulse also fed to the synchronizing circuit 26 from clock 28. The phase difference between these pulses is then used to control the clock frequency such that the clock 28 and the all zeros pulse will be synchronized.

On the receipt of all ones, following all zeros, by the calibrate lock on circuit 24, the digital integrator 20 is no longer allowed to free run but is started every ⅛ second. The integrator 20 then integrates 1000 samples and stops dumping the average into register 22. Also at this time the D to A converter 30 is no longer inhibited by the calibrate lock on circuit 24, thus, the D to A converter 30 then may convert the digital output of the register 22. The calibrate lock on circuit 24 also furnishes the address (0–31 count) of each bit of data in each frame so that they may be correlated for display or further processing. Furthermore, it should be noted that the A to D converter 18, digital integrator 20 and D to A converter 30 are well known in the art and typical of the devices disclosed in the "Digital Equipment Corp. Handbook", positive logic division, copyright 1969. The D to A converter 30 output is connected to such further processing or display equipment not shown.

Figure 3:
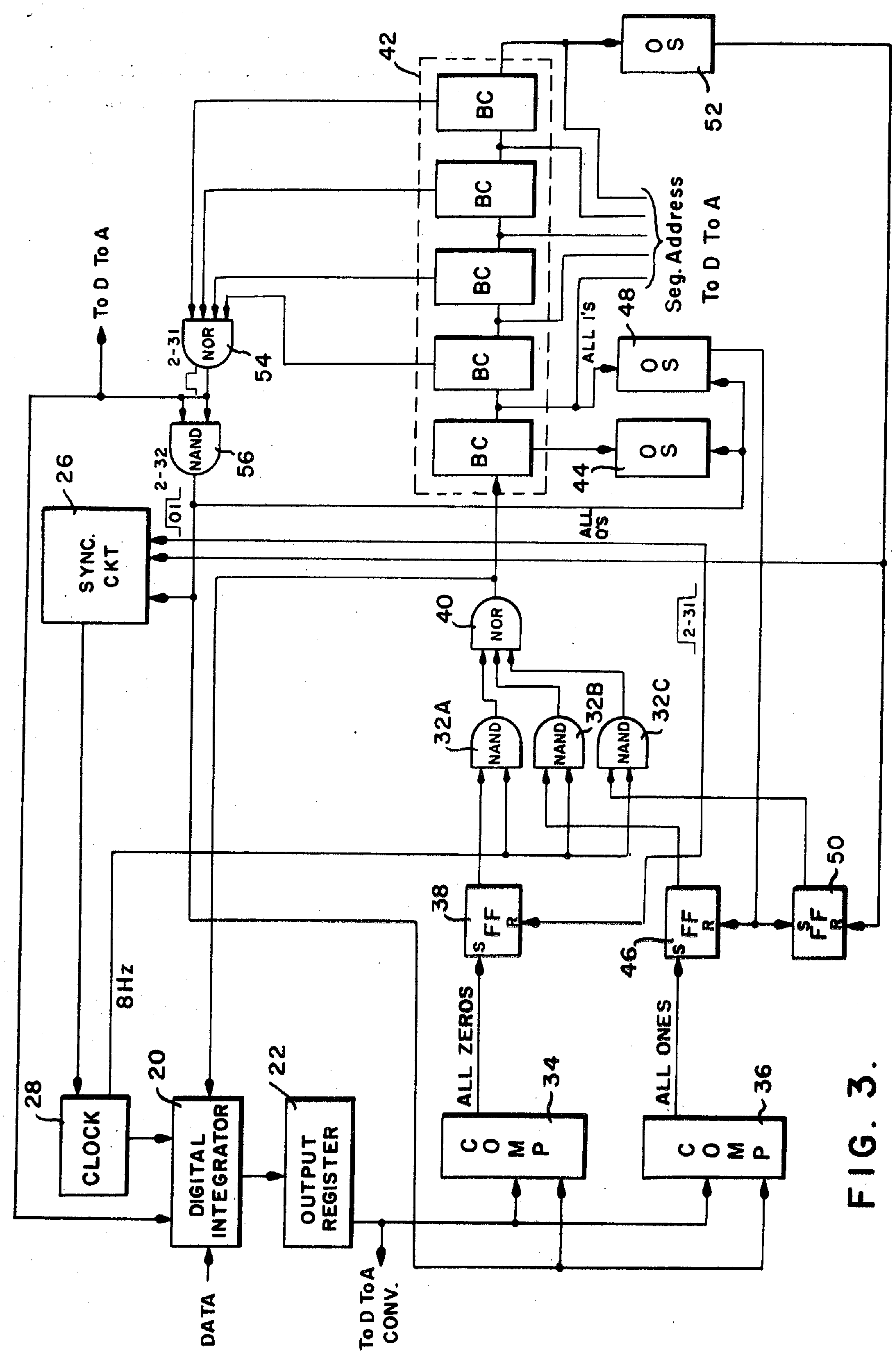
FIG. 3, shows the calibrate lock on circuit.

Referring to FIG. 3 which shows the calibrate lock on circuit 24, the clock 28 is shown supplying 40 kHz to the digital integrator 20 and 8 Hz to NAND gates 32A, B and C. Digital data from the A to D converter 18 is supplied to integrator 20, the output of which coupled to register 22. At the completion of each average by the integrator 20 the average is dumped into register 22 and fed to the D to A converter 30, and the all zero and all ones comparators 34 and 36 respectively. Upon receipt of all zeros flip flop 38 is set and allows the 8 Hz clock pulse to pass through NAND gate 32A, NOR gate 40 and to trigger the least significant stage of segment counter 42 from a binary zero to binary one which triggers one shot 44 and gives the indication of all zeros which resets flip flop 38 and is coupled to the synchronizing circuit 26 to be compared with the clock phase. The calibrate lock on circuit 24 remains in this state until all ones is received by comparator 36, usually in the same frame but it may be in a later frame. The all ones comparator 36 sets flip flop 46 allowing the 8 Hz clock pulse to pass through NAND gate 32B and NOR gate 40 to trigger the counter 42 from a binary one to a binary two. The negative transition triggers all ones one shot 48, the output of which resets flip flop 46 and sets flip flop 50. Flip flop 50 allows the 8 Hz pulses to pass through NAND gate 32C and NOR gate 40 to trigger counter 42 and to start digital integrator 20 which is no longer inhibited. Counter 42 continues to count the 8 Hz pulses until 31 have been received, which should be the end of a frame. The last stage of the counter 42 triggers the end count one shot 52 which generates a reset pulse which is fed to the synchronizing circuit 26 to reset the circuits in the search mode. The reset pulse further resets flip flop 50 inhibiting the counting of further clock pulses. The calibrate lock on circuit 24 is now in the search mode awaiting all zeros out of the register 22. The "1" outputs of all the stages of the counter 42 are fed to the D to A converter 30 though not converted the address of the segments passes on to the further processing equipment along with the analog output of D to A converter 30. output The four most significant stages of the counter have their "0" outputs connected to NAND gate 54 giving an allow gate to the D to A converter 30 and an inhibit gate to digital integrator 20 whenever the count is between 2 and 31. The D to to A converter 30 is allowed to operate between a count of 2 to 31 while the digital integrator is inhibited from free running and must be started by segment count output of NAND gate 40. The output of NAND gate 54 is inverted by NAND gate 56 to provide an indication of a 0 to 1 count. This "01"count gate allows the all zeros and all ones one shots 44, 48 and the comparators 34, 36 respectfully to operate during the search mode. The "01" count gate is also fed to the synchronizing circuit 26.

Now referring to the synchronizing circuit 26 FIG. 1, the inputs are 1600 Hz and 160 Hz from the clock 28, and the "01" count gate which starts the search mode, an all zeros pulse which sets the phase difference between the clock and all zeros, and the reset pulse which resets the synchronizing for another all zeros pulse.

The synchronizing circuit operates in three modes. The first is the search mode before the receipt of the all zeros pulse. The second is a phase adjust mode within the search mode where the all zeros pulse sets the phase difference between the clock and the all zeros pulse. Upon receipt of the all ones pulse the synchronizing circuit shifts to a sync mode where the clock frequency in adjusted in response to the phase difference between the all zeros pulse and the clock.

Figure 4:
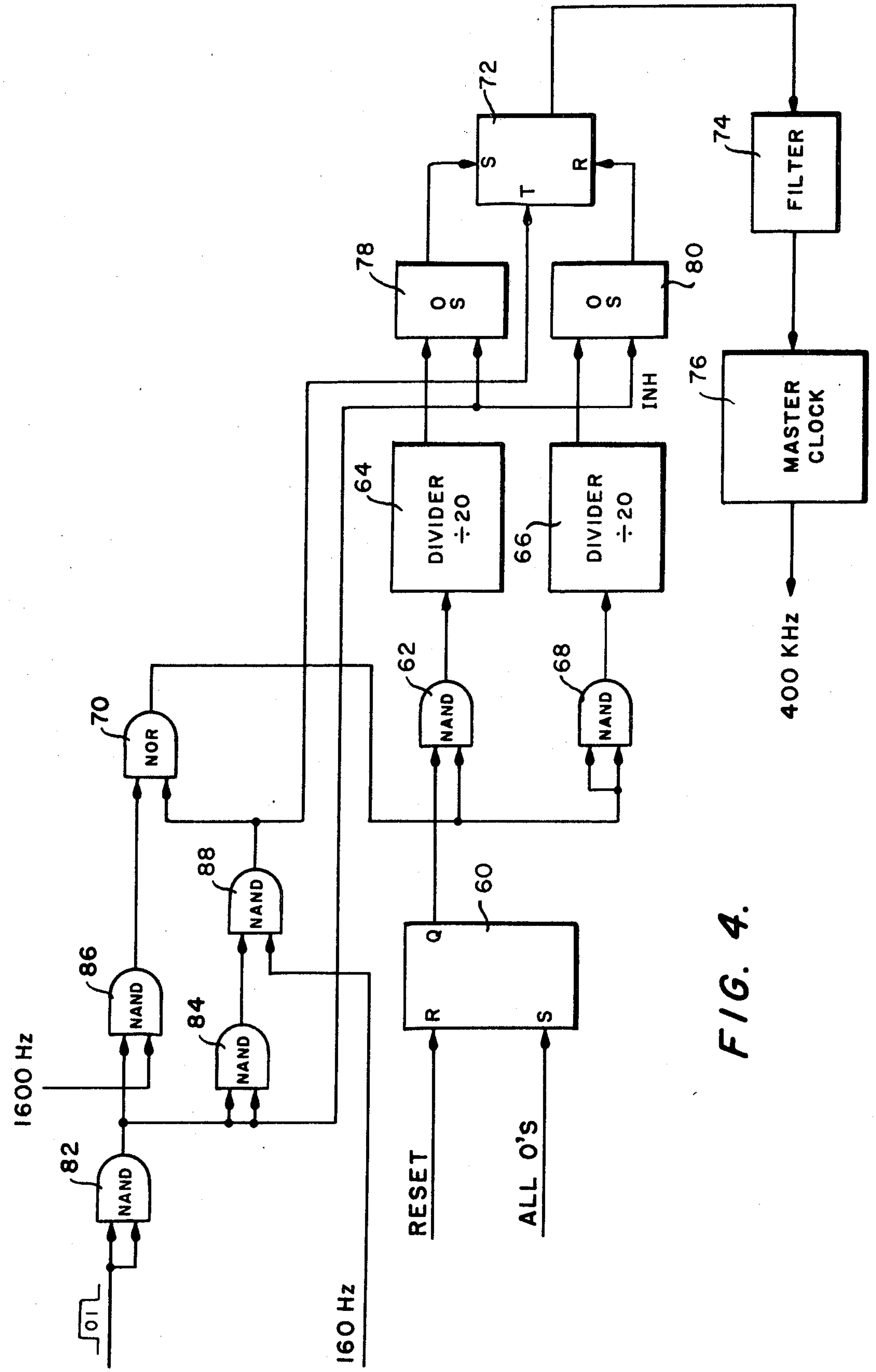
FIG. 4, shows the clock synchronizing circuit.

Looking to FIG. 4, the all zeros pulse is connected to the set input of flip flop 60. The Q output of flip flop is connected to NAND gate 62 so that after receipt of the all zeros pulse gate 62 is allowed thus divider 64 may be started in some phased relation with divider 66 which is driven continuously through NAND gate 68.

Figures 5, 6:
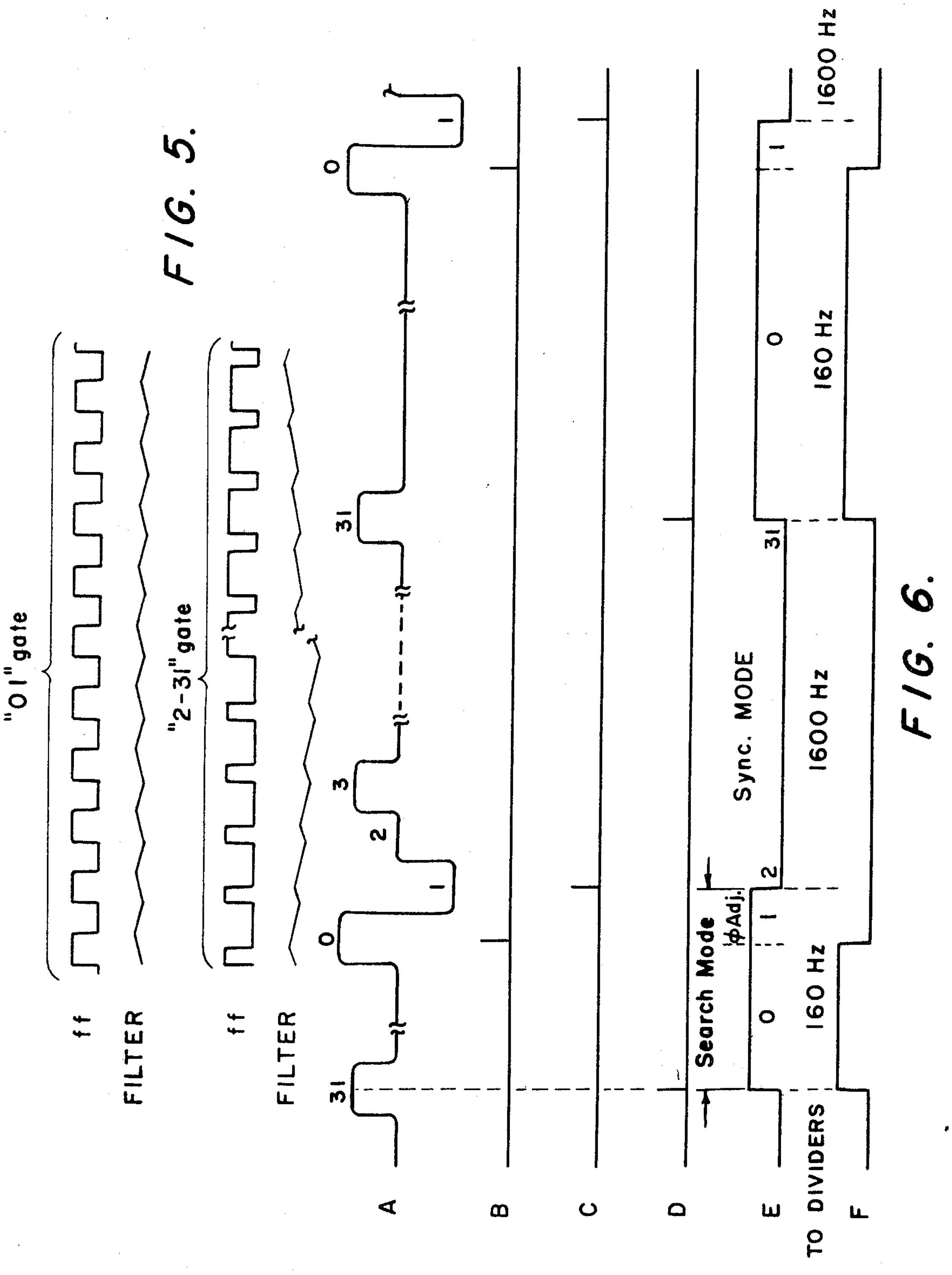
FIG. 5, shows clock control voltage.
FIG. 6, shows an over all timing diagram for the system.
Figure 7:
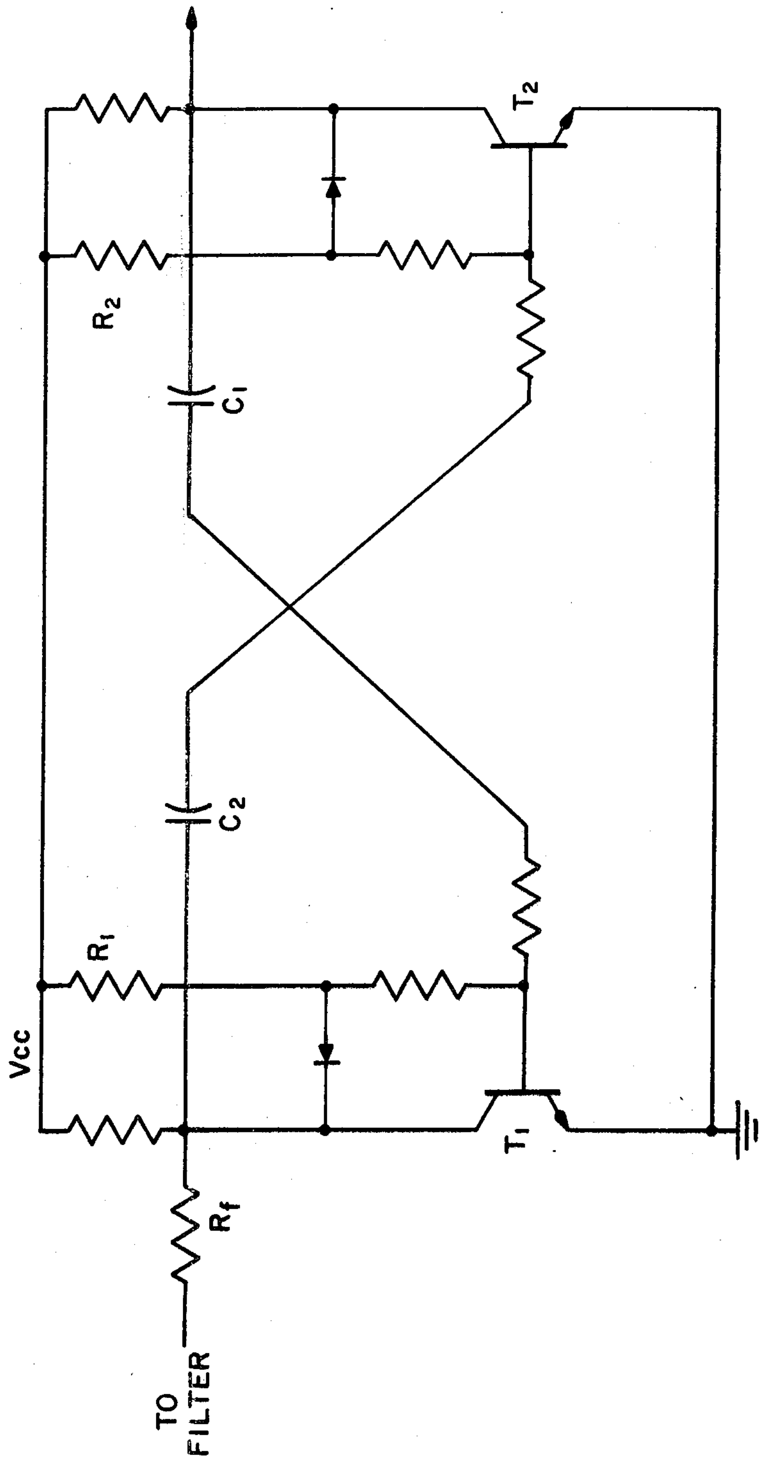
FIG. 7 is a schematic of a typical astable multivibrator.

Thus during the phase adjust mode, which is started by the all zeros pulse, both dividers are being driven by 160 Hz from NOR gate 70 through gate 62 and 68. As NAND gate 68 is driven only by the clock pulses divider 66 divides continuously, divider 64 may be started at any count later than the start of a dividing count by divider 66. Here both dividers divide by 20 thus divider 64 can run delayed behind divider 66 up to a count of twenty. When these outputs are coupled to the set and reset inputs of a flip flop 72 the output duty cycle can be varied so that the high output remains on mere or less than 50 percent of the time. When this variable duty cycle ouptut is filtered, such as by an integrating filter, the filter 74 output will be a varying D.C. level according to the duty cycle of flip flop 72. Thus when this D.C. voltage is connected to a voltage controlled clock 76 which corresponds to a 50 percent duty cycle for flip flop 72 it is seen that by varying the duty cycle around 50 percent the clock frequency can be shifted thereby changing the phase of the clock relative to the all zeros pulse. Thus to lock the clock on to the data, if the clock is run at a certain frequency until clear data is received (all zeros pulse); and the phase of the received data is compared with the clock, and the clock frequency adjusted accordingly up or down for correct phasing. This is done in each frame received. The reset pulse out of the calibrate lock on circuit resets flip flop 60 to stop counter 64 until the next all zeros pulse. Also while the "01" count gate is applied to the synchronize circuit the 1600 Hz from the clock is gated through NAND gate 88 and NOR gate 70 to toggle the flip flip 72 at a 80 Hz rate and 50 percent duty cycle. Thus the clock oscillator runs at its predetermined frequency, here 400 kHz. When all zeros is received flip flop 60 allows divider 64 to start counting setting the duty cycle of flip flop 72 by the phase relationship between dividers 64 and 66. But one shots 78 and 80 inhibit the divider count output from the flip flop which continues to be driven at a 50 percent duty cycle 80 Hz rate by the 160 Hz until all ones is received. At this point the lock of the "01" count gate through NAND gates 82 and 84 inhibits the 160 Hz, and allows the 1600 Hz through NAND 86 to drive the dividers 64 and 66, and also allows the one shots 78 and 80. Thus triggering set and reset inputs of flip flop 72 at a 80 Hz rate with the duty cycle being determined by the difference between the start count in dividers 64 and 66. For example assume that when divider 66 resets flip flop 72 divider 64 in a count of 5 thus will set flip flop 72 fifteen counts later. This will continue with 15 counts of low or zero output and 5 counts of high or one output on duty cycle of 25 percent. This 25 percent duty cycle square wave will be filtered and fed to the clock causing an increase in the clock frequency during the "2–31" count gate. At the end of the "2–32 count gate the "01" count gate causes the duty cycle to return to 50 percent and the clock frequency returns to 80 Hz. FIG. 5 shows the output of flip flop 72 and filter 74 outputs during the search mode ("01") and the synchronize mode ("2–31"). FIG. 6 shows the overall timing of the system. A is data frame consisting of frames 0–31, B is the all zeros pulse, C is the all ones pulse, D is reset pulse (count 31) E is the "01" allow gate output of the calibrate lock on circuit and F is the output of flip flop 60. In view of the above explanation and above mentioned timing diagrams the operation of the system should be self evident except for the particular voltage controlled clock used. FIG. 7 shows a standard astable multivibrator. Where the output of the filter 74 is connected either to the collector of $T_1$ or $T_2$ through a resistance $R_f$ representing the filter resistance. By applying the filter voltage to the collector of $T_1$ the voltage to which $C_2$ can charge may be controlled by the interaction of the filter and $V_{cc}$ which is fixed. Thus the filter voltage will control the time of discharge and thus turn on of $T_2$ for $C_2$ and $R_2$ of a fixed value.

For general operation the system is set up in the search mode with 50 percent duty cycle to the filter 74 thus the filter voltage will be an average D.C. value somewhat less than $V_{cc}$. Then $R_1C_1$ and $R_2C_2$ are adjusted to achieve a 400 kHz clock output from the multivibrator from either collector $T_1$, $T_2$. Thus adjusted only charges in the filter voltage effect the frequency of the multivibrator and thus the system clock.

Of course it is realized that both the collector voltages could be controlled thus controlling the timing period of both transistor $T_1$ and $T_2$.

There has been disclosed an invention which is capable of automatically locking onto and tracking received data.

Obviously many modifications and variations of the present invention are possible in the light of the above teachings. It is therefore to be understood, that within the scope of the appended claims, the invention may be practiced otherwise than as specifically described.

What is claimed and desired to be secured by Letters patent of the United States is:

1. A synchronizing system comprising:

analog to digital converter means for converting varying analog level segments, which comprise a frame of information, into separate word segments;

said frames being received at random times;

detecting means coupled to said converter means for detecting the first and last segments in said frames and generating first and second pulses respectively, in response thereto;

said detecting means further including means for producing an allow indication when no frame is present and when the first segment has been received;

said allow indication, and said first and second pulse from said detecting means each being connected to a synchronizing means and said synchronizing means being coupled to a clock wherein the phase of said clock is adjusted in response to the timing of said frames;

said synchronizing means comprising logic means which receives clock pulses from said clock and said allow indication from said detecting means, said logic means having its output clock pulses connected to a timing means;

said first pulse output of said detecting means being connected to said timing means;

said timing means developing a voltage in response to the delay between said first pulse and said output clock pulses;

said voltage being coupled to an oscillator in said clock so that the frequency produced by said oscillator is changed is charged in response to said voltage thereby changing the phase relationship of said clock and said first pulse.

* * * * *